(12) United States Patent
Majidi et al.

(10) Patent No.: US 10,554,154 B2
(45) Date of Patent: Feb. 4, 2020

(54) ELECTROSTATIC CLUTCH

(71) Applicant: CARNEGIE MELLON UNIVERSITY, a Pennsylvania Non-Profit Corporation, Pittsburgh, PA (US)

(72) Inventors: Carmel Majidi, Pittsburgh, PA (US); Steven Collins, Pittsburgh, PA (US); Stuart Diller, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/513,593

(22) Filed: Jul. 16, 2019

(65) Prior Publication Data

US 2019/0363648 A1 Nov. 28, 2019

Related U.S. Application Data

(63) Continuation of application No. 15/484,052, filed on Apr. 10, 2017, now Pat. No. 10,355,624, which is a continuation of application No. PCT/US2015/055005, filed on Oct. 9, 2015.

(60) Provisional application No. 62/495,693, filed on Sep. 21, 2016, provisional application No. 62/231,818, filed on Jul. 16, 2015, provisional application No. 62/122,066, filed on Oct. 9, 2014.

(51) Int. Cl.
*F16D 28/00* (2006.01)
*H02N 13/00* (2006.01)
*F16D 27/00* (2006.01)

(52) U.S. Cl.
CPC ............. *H02N 13/00* (2013.01); *F16D 27/00* (2013.01); *F16D 28/00* (2013.01)

(58) Field of Classification Search
CPC ................................ H02N 13/00; F16D 28/00
See application file for complete search history.

(56) References Cited

U.S. PATENT DOCUMENTS

| | | | | |
|---|---|---|---|---|
| 3,325,709 A * | 6/1967 | Anderson | ............. | B65H 5/004 361/233 |
| 5,573,088 A * | 11/1996 | Daniels | ............. | B60G 17/0157 188/267 |
| 7,838,133 B2 * | 11/2010 | Zhang | ................... | C23C 14/088 428/701 |
| 9,550,665 B2 * | 1/2017 | Barker | ................... | H02N 1/006 |
| 2003/0142456 A1 * | 7/2003 | Carnahan | ............. | B82Y 10/00 361/233 |

(Continued)

*Primary Examiner* — Stacey A Fluhart
(74) *Attorney, Agent, or Firm* — Michael G. Monyok

(57) ABSTRACT

An electrostatic clutch is described comprising a plurality of micron-scale thickness electrodes, adjacent electrodes being separated by a thin film of dielectric material. A power source and controller apply a voltage across two electrodes, causing an electrostatic force to develop. When engaged, a force can be transferred through the clutch. A tensioning device maintains the alignment of the clutch when the electrodes are disengaged, but permits movement in at least one direction. In some embodiments, multiple clutches are connected to an output to provide variable force control and a broad range of torque input and output values. Moreover, the clutch can be used as an energy-recycling actuator that captures mechanical energy from negative work movements, and returns energy during positive work movements.

11 Claims, 15 Drawing Sheets

(56) References Cited

U.S. PATENT DOCUMENTS

| | | | |
|---|---|---|---|
| 2009/0041980 A1* | 2/2009 | Miyashita | H01L 21/6831 428/138 |
| 2013/0120897 A1* | 5/2013 | Lin | H02N 13/00 361/234 |
| 2013/0242455 A1* | 9/2013 | Prahlad | B25J 15/0009 361/234 |
| 2014/0277739 A1* | 9/2014 | Kornbluh | B25J 9/0006 700/260 |
| 2015/0315817 A1* | 11/2015 | Obzhirov | E05B 47/00 361/234 |
| 2017/0287764 A1* | 10/2017 | Kouno | H01L 21/3065 |

* cited by examiner

ELECTROSTATIC CLUTCH

CROSS-REFERENCE TO RELATED APPLICATIONS

The present application claims priority and the benefit of the filing date under 35 U.S.C. § 120 of U.S. application Ser. No. 15/484,052 filed on Apr. 10, 2017, which claims the benefit of Provisional Ser. No. 62/495,693, filed Sep. 21, 2016 and PCT Application No. PCT/US2015/055005, filed Oct. 9, 2015, which claims priority to Provisional Ser. No. 62/122,066, filed Oct. 9, 2014, and Provisional Ser. No. 62/231,818, filed Jul. 16, 2015, all of which are incorporated herein by reference.

STATEMENT REGARDING FEDERALLY SPONSORED RESEARCH

This invention was made with government support under NSF Grant No. IIS-1355716. The government has certain rights in this invention.

BACKGROUND OF THE INVENTION

The invention relates generally to an electrostatic clutch. More specifically, the invention relates to a lightweight and high power density electrostatic clutch that can be incorporated into robotic systems, including exoskeletons and wearable devices, among other uses.

Clutches have many uses in mechanical systems, often being used to improve the functionality of springs and actuators. However, existing clutch systems suffer several drawbacks when used in mobile applications, such as robotics. For example, electromagnetic clutches feature fast activation and moderate torque density, but require continuous electrical power to stay active. Magnetorheological clutches produce large torques, but are heavy and also require continuous power to remain active. Because of the power requirements, both of these systems require large batteries or tethered electrical connections. Mechanical latches require no energy to stay active, but only engage and disengage under special conditions.

The problems associated with traditional clutches are particularly pronounced in wearable robotic systems, such as exoskeletons. Assistive robotic exoskeletons have shown positive impacts for people in a variety of applications, including physical performance augmentation and medical treatment. One challenge associated with autonomy is the metabolic cost associated with carrying the combined weight of the exoskeleton structure, energy storage, actuators, and electronics. Batteries in particular account for a significant portion of the weight of many devices, especially in devices with clutches that require constant power. In addition to the weight of batteries, significant weight penalties are experienced with commercially available actuators, such as motors and pneumatic actuators.

Walking on level ground is an example of an application where traditional actuators and motors are not well suited for robotic applications. Walking on level ground at a constant speed requires very little energy input since the potential and kinetic energies of the moving body do not change on average. However, approximately equal amounts of positive and negative work are performed by the legs during a walking cycle. Both the positive and negative work require energy, since the negative work cannot be stored and reused as an input for the positive work.

If an actuator could absorb and return mechanical energy, the total energy consumption of the system could be reduced. Ideally, energy recycling could supply all needed positive work by absorbing and reusing negative work movements. As an added benefit, using a device to absorb energy from negative work movements would reduce the metabolic cost of a human wearing a robotic device because muscles require energy to perform negative work.

Lightweight, low-power, and electrically controllable clutches would allow greater performance of many robotic systems. Improved clutches could be incorporated into actuators to substantially improve the actuator's energy demands. Therefore a need exists for a clutch that does not exhibit any of the shortcomings of traditional clutches.

BRIEF SUMMARY OF THE INVENTION

According to embodiments of the present disclosure is an electrostatic clutch that can be incorporated in many types of mechanical systems, such as robotics, wearable devices, or exoskeletons. In particular, the present invention utilizes micron-thickness electrostatic clutches that are light-weight and consume minimal power.

Electrostatic forces can be developed by applying a voltage to a set of electrodes separated by a gap. In the present invention, the gap is maintained by a layer of dielectric material deposited on the electrode. When a voltage is applied, positive and negative electrical charges develop, causing an attraction between the adjacent electrodes and preventing them from moving relative to each other. Like a capacitor, power consumption is very low once a charge is developed because additional energy is only required when switching states. A controller can manipulate the voltage, allowing electrical 'on-off' control of adhesion between the electrodes.

The electrodes comprise a lightweight conductive material, such as aluminum-sputtered biaxially-oriented polyethylene terephthalate. With a pair of electrodes, at least one electrode is covered in a dielectric material to maintain the gap between the conductive surfaces of the electrodes. In some embodiments, the electrodes are generally planar, having a rectangular or square shape. A frame is connected to each of the electrodes, providing a transfer point for a force acting on the clutch. For example, the frame of one electrode could be connected to a spring, while the frame of the other electrode could be connected to the body of an exoskeleton. Thus, the activation state of the clutch determines if a force is transferred from the spring to the body of the exoskeleton through the clutch, or if the electrodes will simply slide against each other without transferring the force. A tensioner maintains alignment of the electrodes, while permitting movement in one or multiple directions.

In an alternative example, three electrodes are arranged in a parallel orientation. One electrode is attached to a body of a device and a second electrode is connected to an output supplying a force. A third electrode is connected to a spring and placed between the first and second electrodes. The electrode connected to the spring can be engaged against either the body electrode or the output electrode. In this configuration, the spring can be stretched by the output force, affixed to the frame to store the energy, then later returned to the output to perform work, forming a type of energy recylcing actuator. Given the micron-scale thickness of the electrodes, the actuator can be comprised of tens to hundreds of clutch/spring pairs that are individually engaged and disengaged with the output, thus allowing variable stiffness and a broad range of torque input and output values over the course of one actuator stroke.

The clutch system of the present application, depending on the particular implementation, uniquely allows for both force control and energy recycling, making it both highly controllable and highly energy efficient. In addition, this system allows variable stiffness, impedance or other state-dependent force generation at exceptionally high bandwidth and with low input of control energy. The clutch system will enable dramatic improvements in the energy efficiency and controllability of autonomous robotic systems and wearable robotic devices.

DETAILED DESCRIPTION OF THE INVENTION

Figure 1:
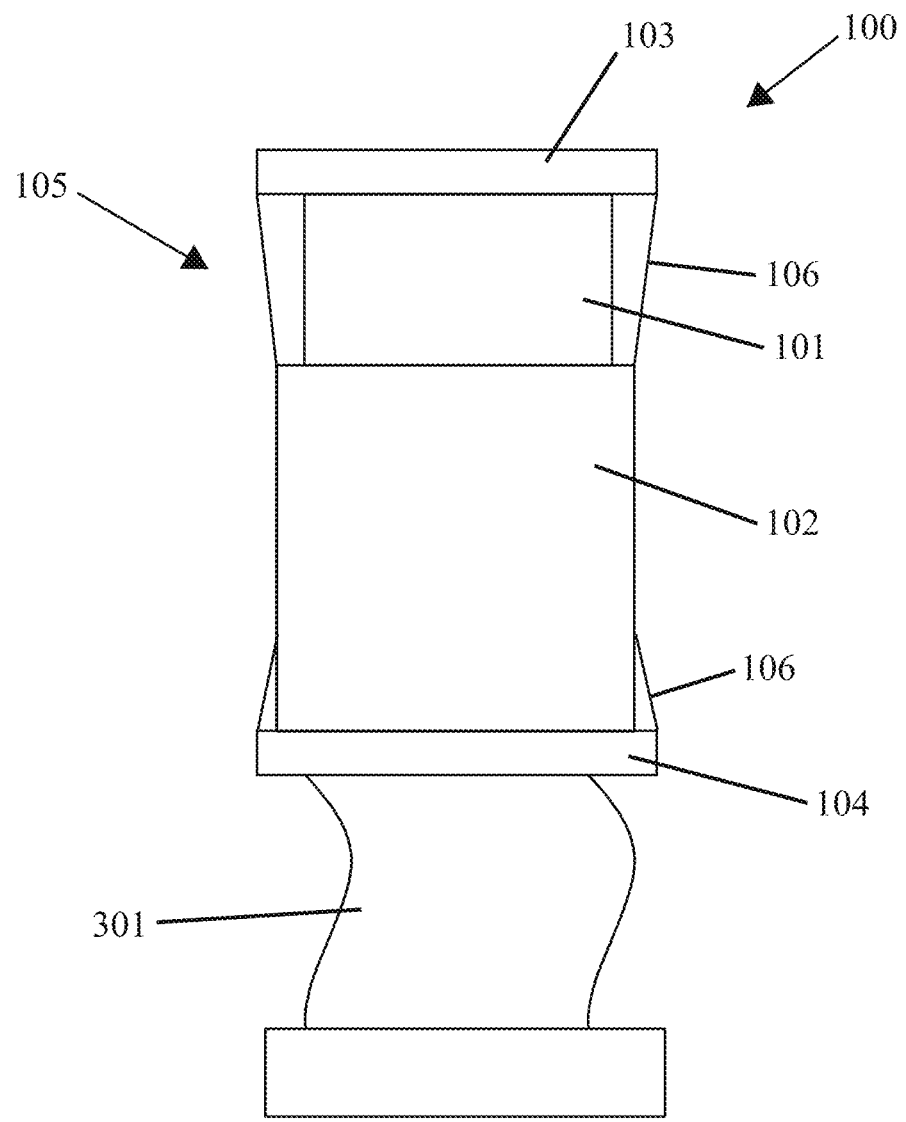
FIG. 1 shows a clutch according to an embodiment of the present invention.

Embodiments of the present invention and its advantages are best understood by referring to the figures. FIG. 1 shows the clutch 100 of the present invention according to one example embodiment. As shown in FIG. 1, the clutch 100 is comprised of a first electrode 101 and a second electrode 102. The electrodes 101, 102 are aligned in a parallel orientation so that a surface of the first electrode 101 overlaps a surface of the second electrode 102. The conductive surfaces 202 do not contact as they are separated by a layer of dielectric material 203 deposited on one or both of the electrodes 101, 102. In this example embodiment, only one electrode 101, 102 is coated with a layer of dielectric material 203 to minimize the distance between the electrodes 101, 102.

A frame 103 is attached to one end of the first electrode 101 and a separate frame 104 is attached to one end of the second electrode 102. The frames 103, 104 are positioned at opposite ends of the clutch 100, as shown in FIG. 1. The frames 103, 104 provide a point of transfer for a force acting on the clutch 100. For example, in the embodiment shown in FIG. 1, the bottom frame 104 is attached to a flat rubber spring 301. The spring 301 can be attached to an object such as the body of an exoskeleton, for example. If the clutch 100 is in an engaged state—when an electrostatic force is causing an attraction between electrodes 101, 102—the spring 301 will impart a tensile force through the electrodes 101, 102 to the top frame 103. When disengaged, the force caused by the spring 301 will simply result in the bottom electrodes 102 sliding freely against the top electrode 101. In other words, the force will not be transferred to the top frame 103.

Referring again to FIG. 1, a tensioner 105 connects the first electrode 101 to the second electrode 102. The tensioner 105 maintains the alignment of the electrodes 101, 102 so that the surfaces of each are in proximate engagement, while also permitting linear movement of the electrodes 101, 102 along the vector of an outside force acting one of the frames 103, 104, when the clutch 100 is in a disengaged state. In the preferred embodiment, the tensioner 105 comprises an elastic cord 106 or low-stiffness spring connecting a distal end of the first electrode 101 to a proximate end of the second electrode 102. The tensioner 105 further comprises an additional cord 106 connecting the proximate end of the first electrode 101 to the distal end of the second electrode 102. A cord 106 is provided on each side of the electrodes 101, 102 to provide lateral stability. In this configuration, side-to-side movement of the electrodes 101, 102 is suppressed, whereas up-and-down movement is allowed. Further, movement orthogonal to the surface of the electrodes 101, 102 is minimized, keeping them in close contact. In alternate embodiments, the tensioner 105 can comprise a pair of frames, each frame attached to the edge of one of the electrodes 101, 102. In this alternative embodiment, the frames are held in place by a track that permits each frame to slide up-or-down, but not laterally.

Figure 2:
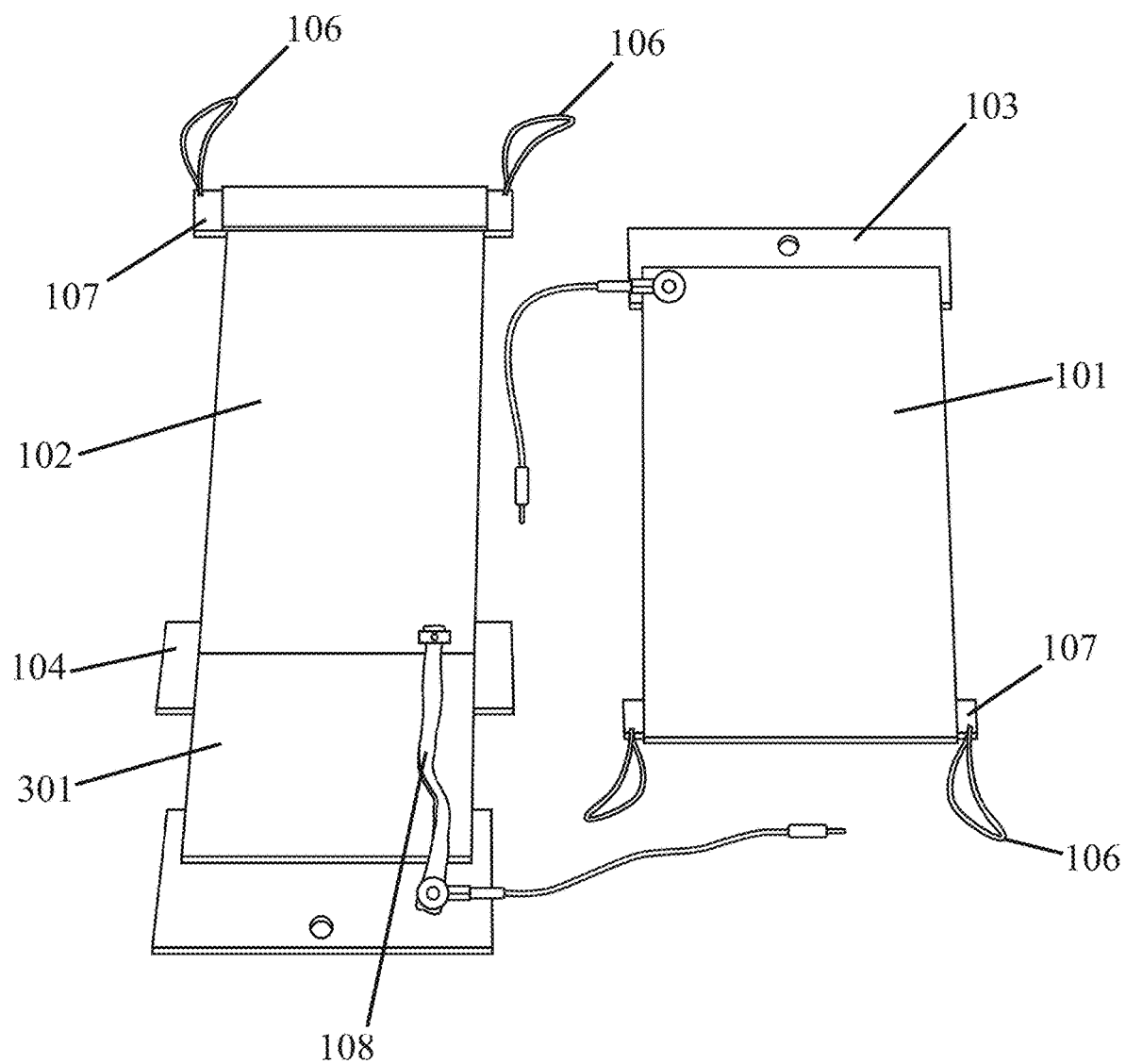
FIG. 2 shows two electrodes that are used in the clutch.
Figure 3:
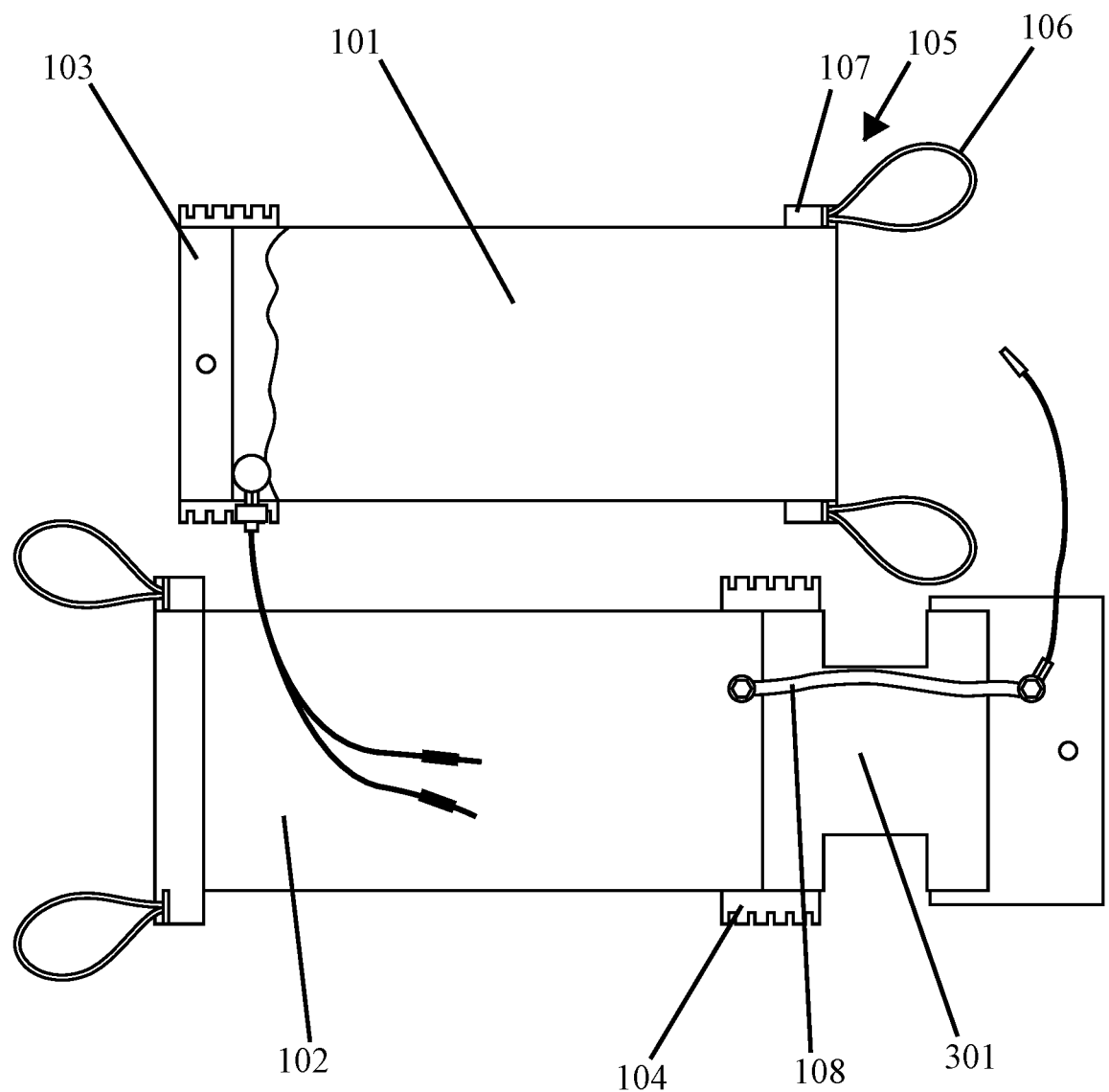
FIG. 3 is an alternate view of the electrodes, which also shows a force transferring spring attached to one of the electrodes.

FIG. 2 shows an alternate view of the clutch 100 according to the embodiment shown in FIG. 1. In FIG. 2, the electrodes 101, 102 are separated from each other to show detail. In operation, the electrodes 101, 102 would be stacked on top of each other, causing close engagement of the surface of each. As shown in FIG. 2, the cords 106 attach to a bar 107 affixed to the ends of the electrodes 101, 102. FIG. 3 is yet another view of the electrodes 101, 102 of the clutch 100. In FIG. 3, a flexible lead 108 is run along the spring 301, providing an electrical contact for the electrode 102.

Figure 4:
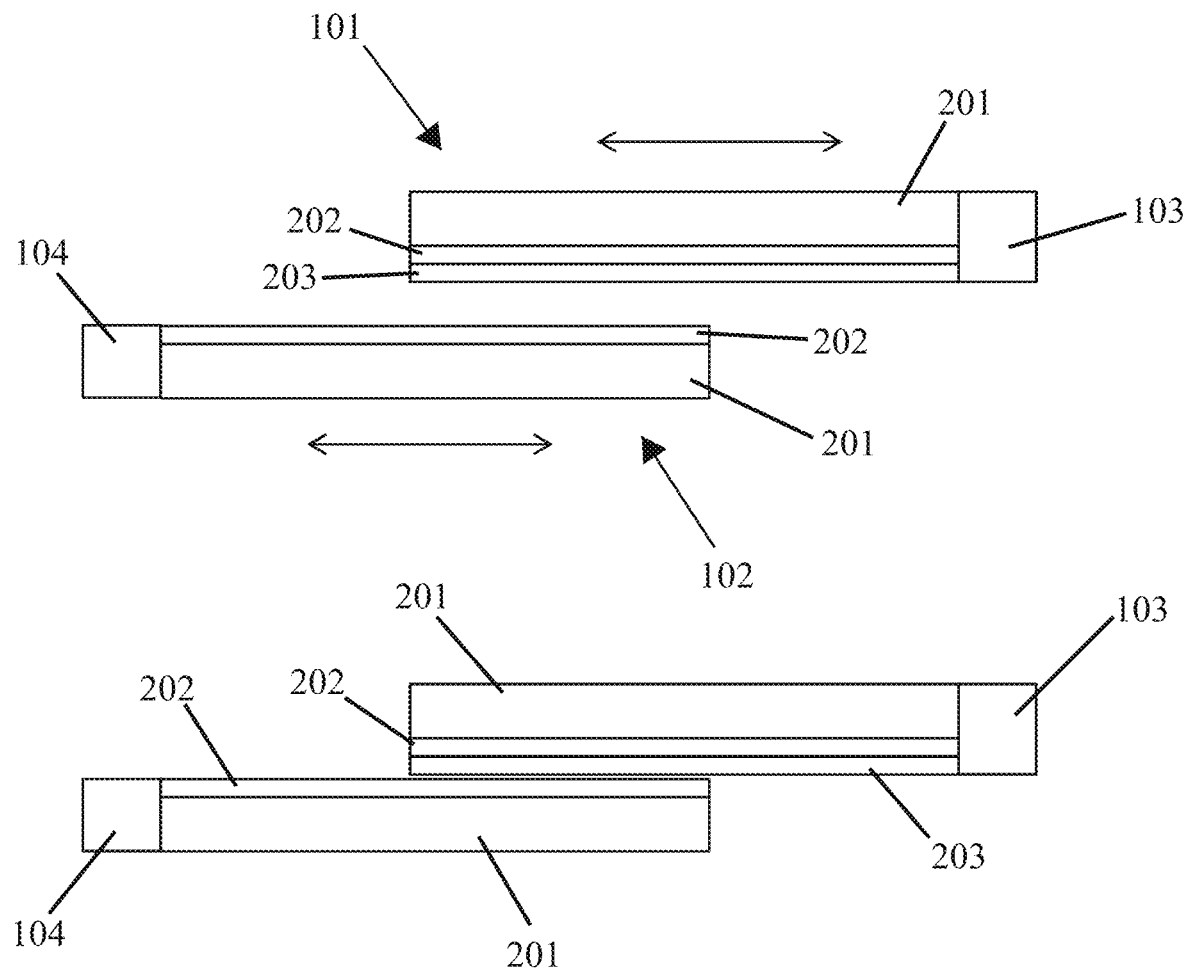
FIGS. 4A-4B is a schematic showing the components of the electrodes, according to one embodiment.

FIGS. 4A-4B show in greater detail the construction of the electrodes 101, 102 according to one embodiment. As shown in FIG. 4A, first electrode 101 and second electrode 102 are comprised of a substrate 201 onto which a conductive layer 202 is deposited. In applications where flexibility of the clutch 100 is desired, the substrate 201 can be constructed from a flexible polymer sheet. For example, in one embodiment, the electrode 101 is comprised of aluminum-sputtered BOPET (Bi-axially Oriented Polyethylene Terephthalate) film, also known as Mylar® film. The aluminum deposition acts as the conductive layer 103 and the BOPET acts as the substrate 102. Aluminum-sputtered BOPET films of this type can have a thickness of around 25 microns. Despite the thin profile, the material is sufficiently strong to act as a force transmission component. In addition, very little electrode material is required to hold a charge, making thin and lightweight electrodes 101 possible. In alternative embodiments, a single-layer, conductive electrode, such as a metallic foil, is used.

FIG. 4A shows the electrodes 101, 102 in a disengaged state. That is, no electrostatic charge is present, so the electrodes 101, 102 are not attracted to each other. (The space between the electrodes 101, 102 in FIG. 4A is exaggerated for purposes of illustration.) When disengaged, the electrodes are free to move along an axis, as indicated by the arrows in FIG. 4A. A tensioner 105, if present, prevents the electrodes 101, 102 from moving in other directions. However, in some implementations, it may be desirable to have the electrodes 101, 102 move in more than one direction, while still maintaining their parallel, or substantially coplanar, arrangement.

In contrast, FIG. 4B shows the electrodes 101, 102 in the engaged state. In the engaged state, a voltage supplied by power source 401 creates an electrostatic charge, causing an attraction of the electrodes 101, 102 and drawing the surfaces of electrodes 101, 102 together. Once engaged, the electrodes 101, 102 can then be loaded in shear, and the friction force resulting from the electrostatic normal force prevents relative displacement of the electrodes 101, 102.

As previously stated, the electrodes 101, 102 can be flexible according to some embodiments. The compliant nature allows intimate surface contact between the electrodes 101, 102 when engaged. This allows the surfaces to conform closely without relying on a high surface energy interface. In previous electrostatic devices, electrodes are embedded in soft, tacky elastomers. Releasing these types of devices requires a separate mechanism because the elastomers tend to stick to each other after being drawn together by the electrostatic forces.

When in the engaged state, a layer of dielectric material 203 maintains the gap between the conductive layers 103 on adjacent electrodes 101, 102. In one example embodiment, a thin film of dielectric material 203 is disposed on the surface of one of the electrodes 101, 102, covering the conductive layer 202. At a given voltage, the capacitance of the clutch 100 increases as the dielectric constant of the material used for the insulating layer 203 increases. As such, a high dielectric constant material is desirable to allow operation at a relatively low voltage. However, the type of dielectric constant material used can depend on the particular application. The dielectric layer 203 can be an inorganic particle impregnated polymer or a liquid-formable nanoparticle composite. In one example, a ceramic polymer composite containing barium titanate and titanium dioxide is used to create the dielectric layer 203. An example of such a material is Dupont™ LuxPrint® material, which is sold for electroluminescent applications. With a low voltage, 200-300 V for example, standard electronics hardware can be used with the clutch 100.

Testing of a liquid formable nanoparticle composite indicates the capability to produce 6 times higher pressures at 15 times lower field strengths than the inorganic polymer (Table 1).

TABLE 1

Measured electrostatic clutching properties of dielectric materials

| Material | Coefficient of Static Friction | Relative Permittivity | Max. Observed Shear Pressure (Field Strength) | Min. Release Time |
|---|---|---|---|---|
| Inorganic particle impregnated polymer | 0.34 ± 0.04 | 1.43 ± 0.09 | 1.82 ± 0.11 kPa (38) MV/m | — |
| Liquid formable nanoparticle composite | 0.40 ± 0.04 | 10.1 | 11.6 kPa (2.5 MV/m) | 6 ms |

Increasing field strength and voltage provide diminishing shear pressure after a critical value is reached. This result is attributed to the development of space charge. Space charge occurs when charge carriers are forced into the dielectric material 203 from the electrodes 101, 102 and become trapped. This creates an internal electric field that counteracts the applied field, and produces some force even after the electrodes 101, 102 are grounded, causing slow or no release. This effect is dependent on the chemical makeup of the dielectric material 203. Avoiding space charge is critical to achieving effective pressure development and fast releasing.

The detrimental effects can be reduced by maintaining low electric field strength and voltage. Consequently, decreasing the thickness and subsequently the overall voltage value can mitigate space charge effects, but the electric field strengths should also be kept low. The liquid formable nanoparticle composite is used in the example embodiment because the high dielectric of the material reduces required field strengths. Also, because the liquid formable nanoparticle composite is obtained in its uncured form, it can be incorporated onto the clutch 100 with a lower thickness.

By way of example, the process of applying the dielectric layer can include depositing a 25 micron layer of the liquid formable nanoparticle composite on one side of electrode 101 using a thin film applicator. Based on the particular dielectric material 203 used, the composite is cured to a thickness of 10 microns in a ventilated oven. A second 25 micron layer is then applied and cured to a final dielectric layer 203 of 20 microns. The film decrease in thickness occurs because a significant amount of solvent evaporates from the original mixture during curing. Other methods can be used to deposit the dielectric layer 203, such as screen printing or chemical and physical deposition.

Figure 5:
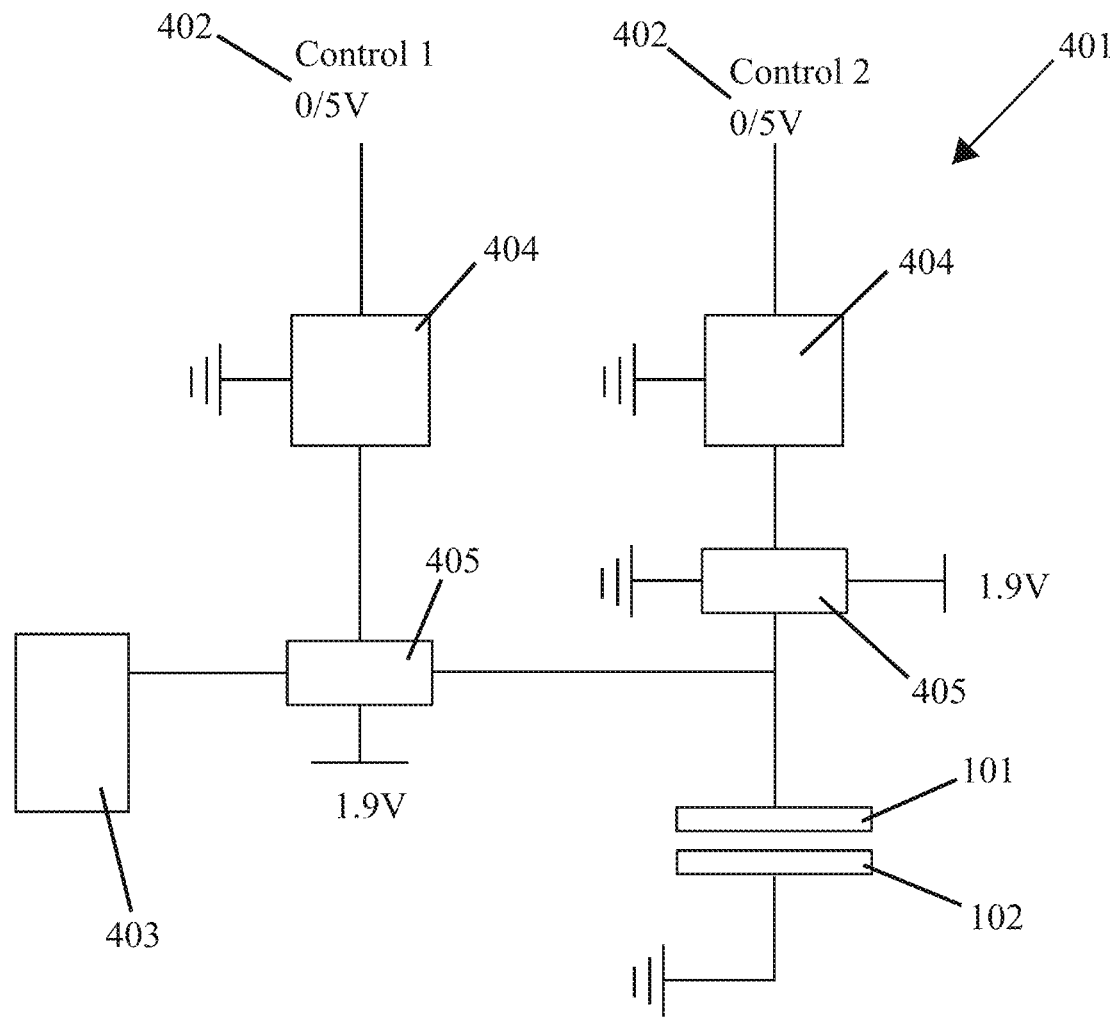
FIG. 5 is a diagram showing the electrical components of a power source and controller attached to the electrodes.

FIG. 5 illustrates one example of a power source 401 and controller 402 capable of controlling the clutch 101. As shown in FIG. 5, a high-voltage power supply 403 (240V, for example), supplies a voltage to the circuitry of the power source 401. A control voltage from controllers 402 are fed into a transistor 404. The controller 402 can be any device capable of producing a signal. In this particular embodiment, the transistor 404 is a Darlington pair transistor. The transistors 404 are connected to a high-voltage relay 405 powered at 1.9V by an external power supply. The relays 405, in turn, are connected to the conductive surface 202 of the dielectric coated electrode 101, such that the electrode 101 is either at high voltage, at ground voltage, or floating. The second electrode 102 is connected to ground. While one particular power source 401 example has been described, a person having skill in the art will appreciate that many types of electrical configurations can be used to apply a voltage to the electrodes 101, 102 of the clutch 100.

With potentials as low as 200 V between electrodes 101, 102, a shear pressures of 15 kPa is generated across electrodes 101, 102 described in the embodiments shown in FIGS. 1-2. In addition, the electrodes 101, 102 fully release in less than 6 ms upon switching of voltage. This results in clutches 100 that have 100 times lower mass and energy use than traditional clutches and 100 times lower voltage and faster release time than otherwise comparable electrostatic clutches.

As a result, when implemented in an actuator or other device, the low-mass, low-energy, and low-volume electrostatic clutch 100 of the present invention allows multiple clutches 100 to be used in a single device. Because of the unique geometry of these electrostatic clutches 100, many can be "stacked" into a small volume with a spacing of 1 mm or less between clutches 100. Achieving tens or hundreds of clutches in a device using traditional mechanical or electromagnetic clutches results in a slow, energy-expensive device far too large and heavy to be body-mounted.

By way of example of a system thus described, a stacked clutch implementation can comprise 5 electrode pairs, each having a thickness of 45 microns and a mass of 2 grams. The contact area of the pairs is 100 cm$^2$ (10 cm×10 cm), resulting in a holding force of 150 N. The switching energy required to change from an engaged to disengaged state is 0.01 J. Switching can occur at a bandwidth of 160 Hz.

The clutch 100 of the present invention is designed to be generic enough to be "attach-and-play" on assistive exoskeletons, active prostheses, walking robots, and other devices. It is an aspect of the present invention that the design can be modified for use with a motor as a variable stiffness actuator, or to achieve "one-to-many" degrees of freedom by decoupling an input from an output. This can be achieved by adding single clutch 100 in series with a clutch-spring pair.

Figure 6:
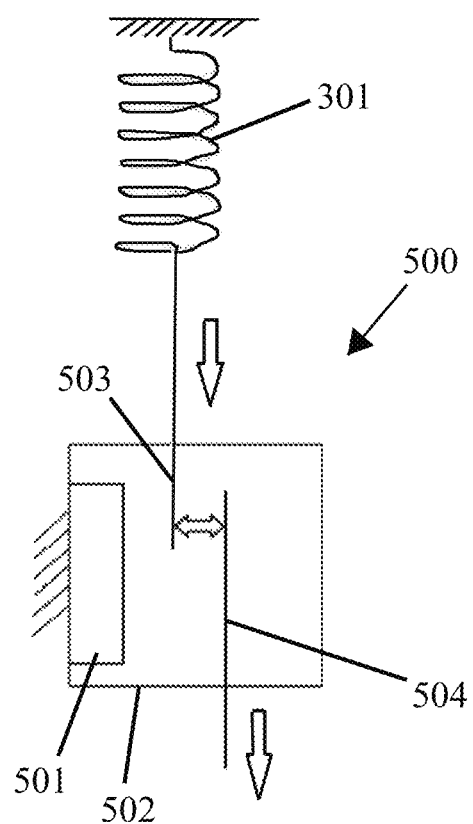
FIG. 6 shows an energy-recycling actuator comprised of the clutches of the present invention.

In another embodiment, multiple electrodes are arranged in parallel to create a type of energy-recycling actuator 500, which is illustrated in FIG. 6. As shown in FIG. 6, the actuator 500 comprises a housing electrode 501 that is connected to a device housing 502. A spring electrode 503 is connected to a spring 301 (or other energy storing device) and is positioned adjacent to the housing electrode 501. Further, the spring electrode 503 is coated with a dielectric layer 203 on two surfaces. A third electrode 504 is placed on the other side of the spring electrode 503, so that the spring electrode 503 is in the middle of the housing electrode 501 and the third electrode 504. The third electrode 504 is connected to an object not connected to the housing 502. When a voltage is applied across two of the three electrodes, it causes those two electrodes to adhere, preventing lateral movement.

Figure 7A:
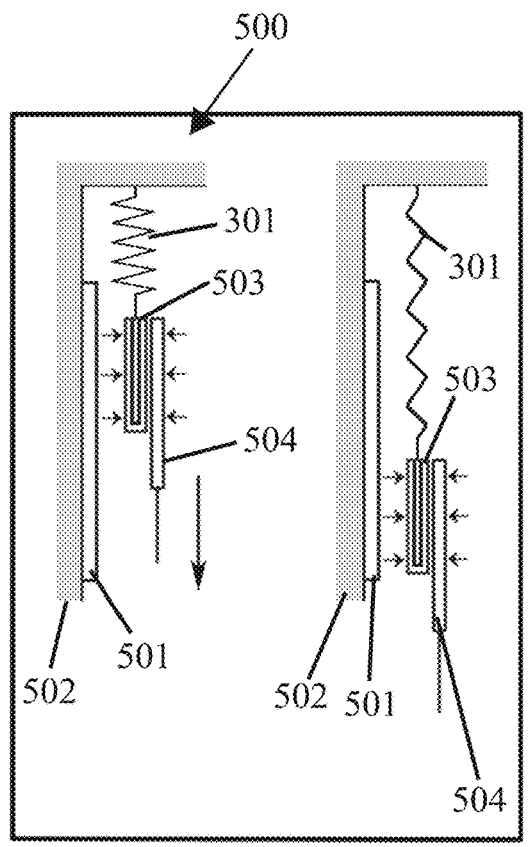
FIGS. 7A-7D is an alternate embodiment of the energy-recycling actuator showing the stages of operation.
Figure 7B:
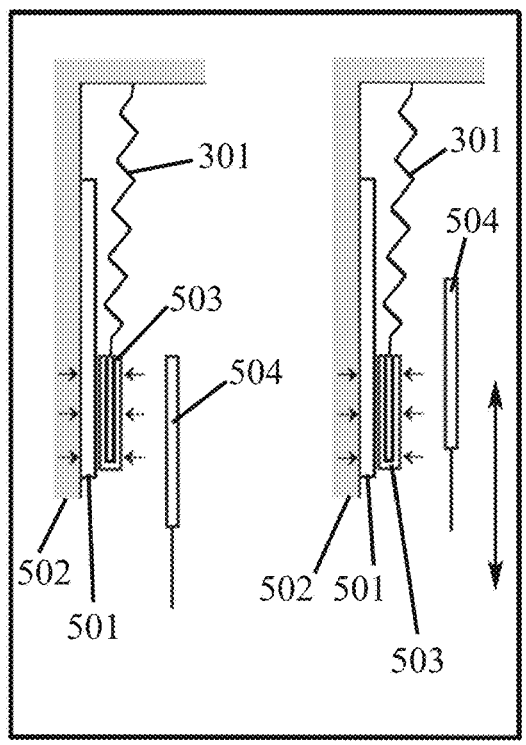
Figure 7C:
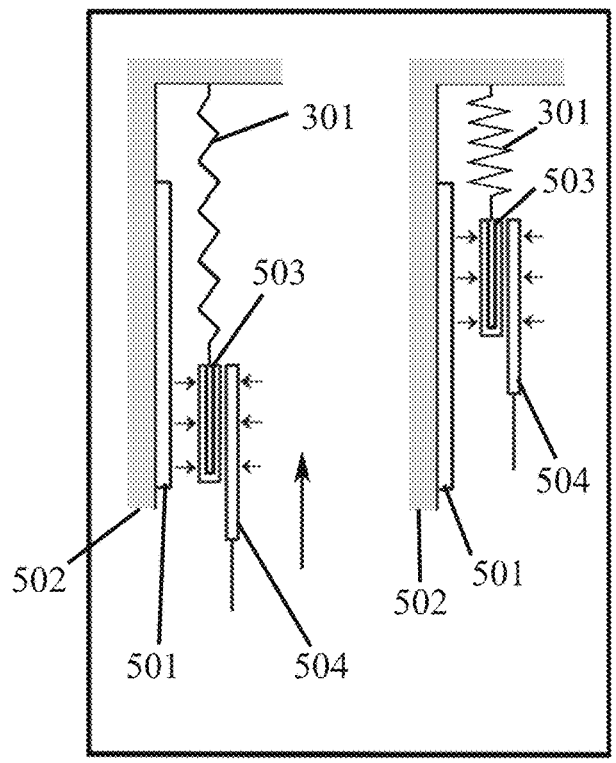
Figure 7D:
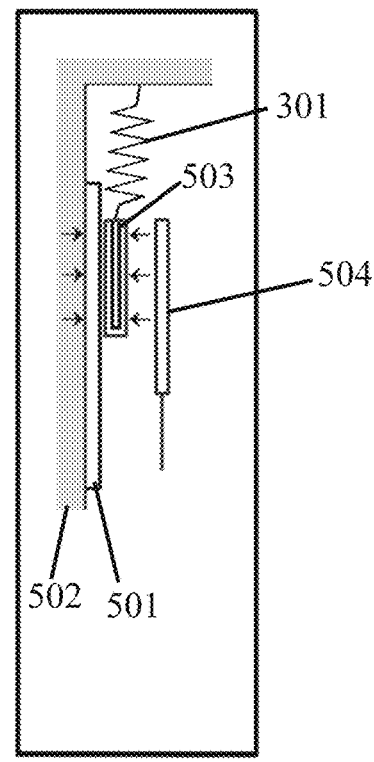

In operation, selective engagement of the electrodes 501, 503, 504 can result in an energy recycling cycle. An example of an energy recycling cycle for a similar actuator 500 is illustrated in FIGS. 7A-7D. As shown in FIG. 7A, during the first step, the third electrode 504 and the spring electrode 503 are engaged, causing the spring 301 to stretch and store energy as a force acts on the object and third electrode 504. Next, in FIG. 7B, the third electrode 504 and spring electrode 503 are disengaged, followed immediately by the spring electrode 503 engaging the housing electrode 501. This allows the housing 502 and object to move freely with respect to each other while the spring remains stretched indefinitely. Next, as shown in FIG. 7C, the spring electrode 503 disengages from the housing electrode 501 and re-engages with the third electrode 504, connecting the spring 301 to the object, providing mechanical work to assist the motion of the object. In FIG. 7D, the spring electrode 503 is engaged to the housing electrode 501, allowing free movement of the object relative to the housing 502 without stretching the spring 301.

Energy capture and return could be achieved with a single spring 301 permanently engaged with the object. However, assistance timing and periods of non-interference are important for many tasks. A device capable of periodically allowing free movement therefore offers more utility. The actuator 500, using a spring 301 and a three-way clutching mechanism provides this utility. In the example of an exoskeleton, the spring 301 could absorb energy from a human's negative work movement. At the end of the movement, the spring 301 is engaged to the housing 502, storing the energy and allowing free movement of the object. When energy is required to assist in a positive work movement, the third electrode 504 is re-engaged with the spring 301, which shortens as it returns energy to the human.

The foregoing example describes an actuator 500 comprised of a single spring/clutch mechanism. However, multiple spring/clutch pairs can be used to create an actuator capable of providing variable stiffness. That is, if all springs 301 are engaged, actuator 500 will have a high stiffness. If only a fraction of the springs 301 are engaged, while the remainder are disengaged and free to move, the actuator 500 will have a reduced stiffness. Consequently, the stiffness of the actuator can be manipulated based on the appropriate level for different types of activities. With a higher stiffness, higher assistive torques will be provided.

Figure 8:
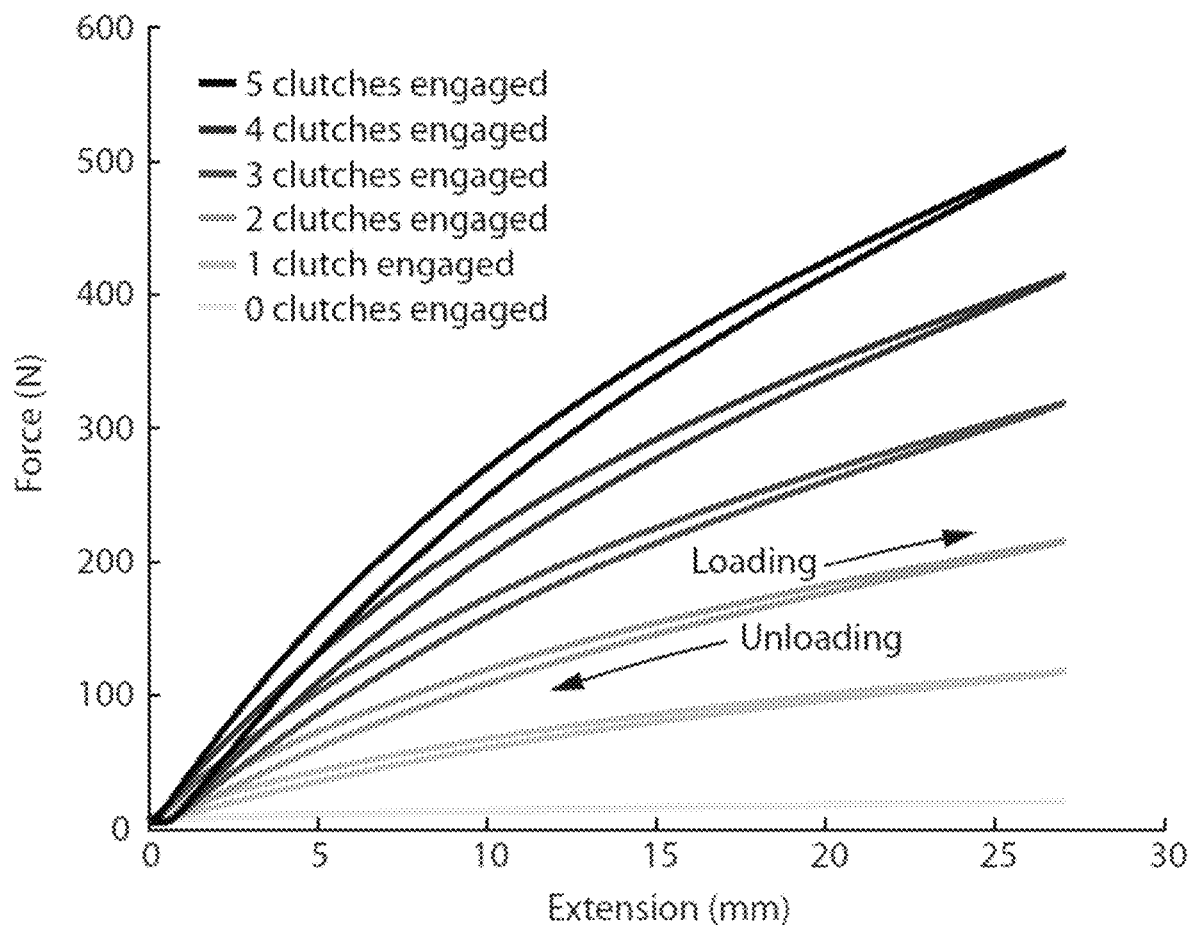
FIG. 8 is a graph illustrating the variable force profile of a device incorporating a plurality of clutches.

By engaging increasing or decreasing numbers of springs 301 during an actuator stroke, a variety of force values can be achieved, independent of device configuration. For example, FIG. 8 shows the force-displacement curve for five clutched springs 301 in parallel. Placing multiple clutched springs 301 in parallel allows an overall device stiffness to be selected. The maximum device stiffness is 36 times higher than the minimum device stiffness in this example.

Figure 9:
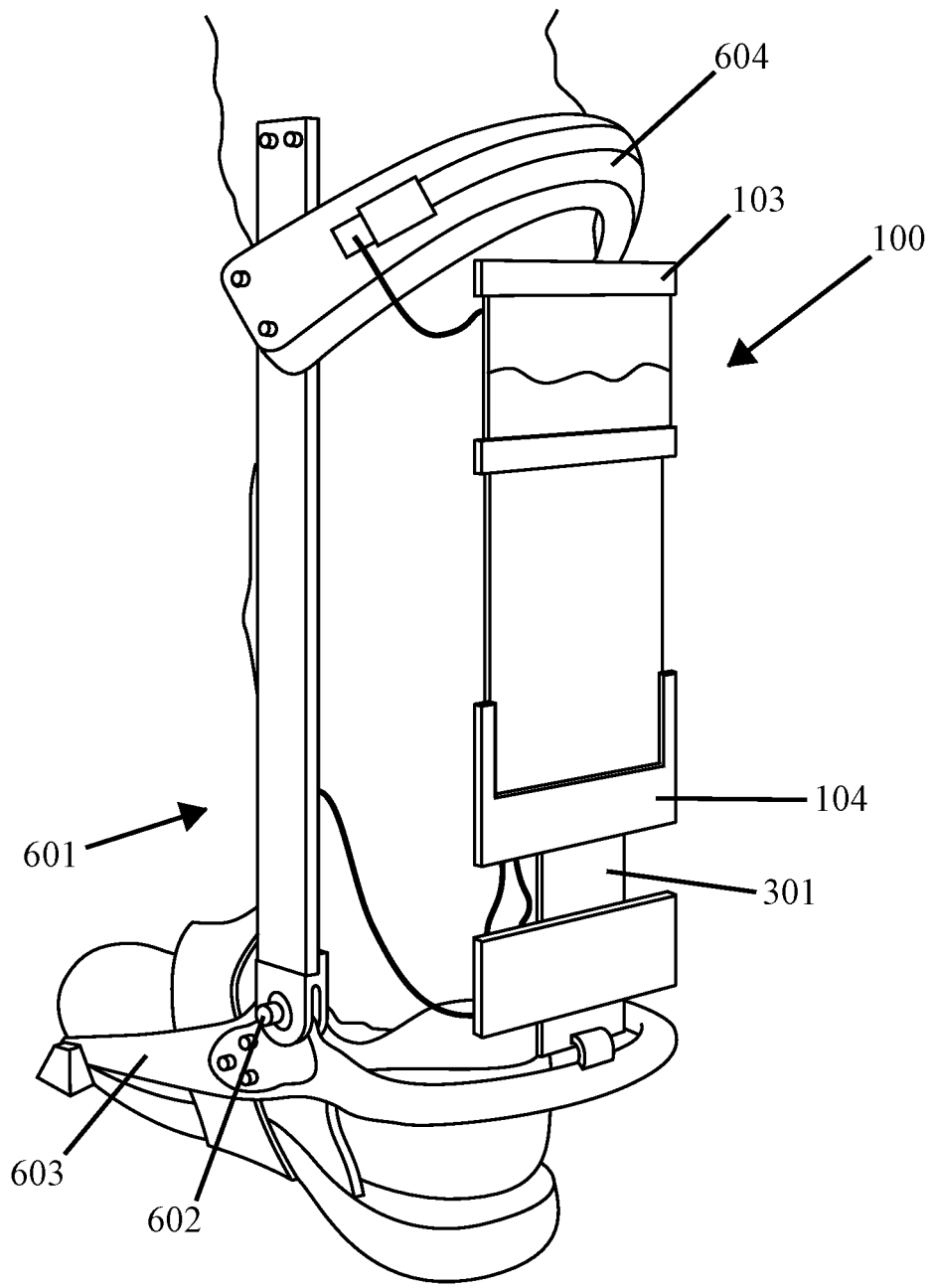
FIG. 9 is an alternate embodiment incorporating an embodiment of the clutch of the present invention.

FIG. 9 shows the electrostatic clutch 100 of the present invention incorporated in to an assistive exoskeleton. In this embodiment, an elastomer spring 301, such as a natural rubber or urethane sheet, is attached to frame 104. Elastomer springs 301 have two significant advantages: they are composed of material with high strain energy density, and they allow an axial loading configuration which further improves energy density because all material is strained equally. In this embodiment, each spring 301 has a mass of about 5 grams, resulting in a total spring mass of about 25 grams for a five spring 301 configuration. The resilience, or efficiency, under normal walking and running conditions is about 95%.

The opposite end of the spring 301 is attached to a lower portion 603 of an exoskeleton frame 601. The exoskeleton frame 601 is a lightweight, high-strength composite frame having a hinge 602 at the ankle, connecting the lower portion 603 to an upper portion 604. Frame 103 is connected to the upper portion 604 of exoskeleton frame 601. During a walking cycle, flexing of the foot causes stretching of the spring 301 when the electrodes 101, 102 are engaged. The energy of the spring 301 can be released during other phases of the walking cycle.

Figure 10:
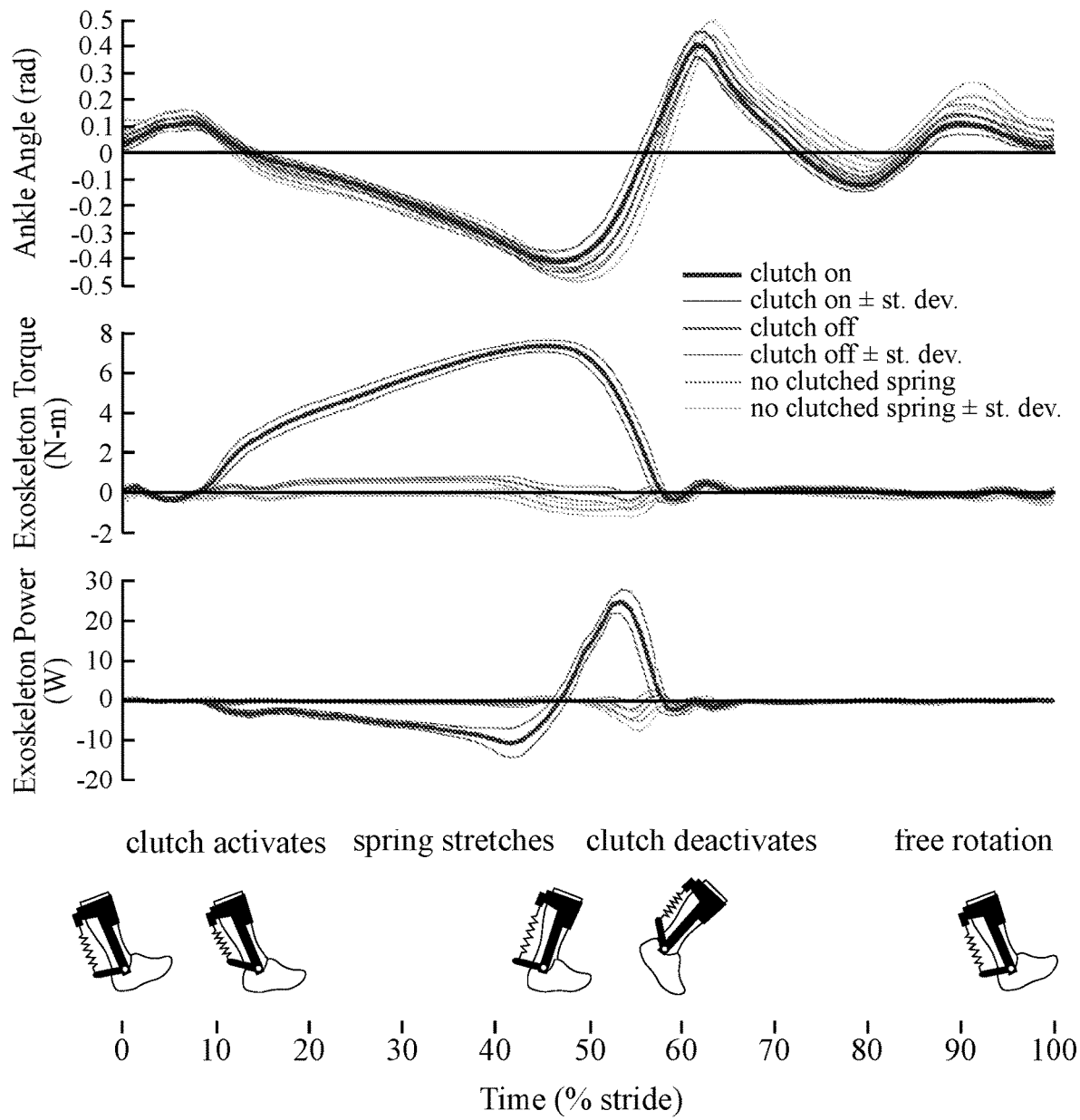
FIG. 10 is a graph showing the 'on-off' control of clutches used in an exoskeleton during a walking cycle.

FIG. 10 shows the clutch 100 activation and deactivation phases during a single step. First, the clutch 100 engages at maximum dorsiflexion, as the foot hits the ground at the beginning of the step. At this point, the spring 301 is slack and not storing energy. As the step continues and the angle of the angle decreases, the spring 301 is stretched. If the electrodes 101, 102 were not engaged, the force on the spring 301 would simply cause the electrodes 101, 102 to slide against each other. The stretching absorbs some of the negative work that would otherwise be performed by human muscles. After peak stretch, the spring 301 provides energy as the foot begins to push off the ground, increasing the ankle angle and shortening the spring 301. As the foot leaves the ground, the clutch 100 deactivates, allowing free rotation of the ankle prior to the cycle starting over. Without the free rotation, energy would have to be used to stretch the spring 301 as the toe is lifted prior to the foot hitting the ground for the next step.

In the preferred embodiment, the electrode 101 is switched between high voltage and ground at 200 Hz for 50 ms to facilitate clutch release. In this example, peak torque is about 7.3 N*m on an average step, and the device consumes about 8.7 mW of electricity.

Figure 11A:
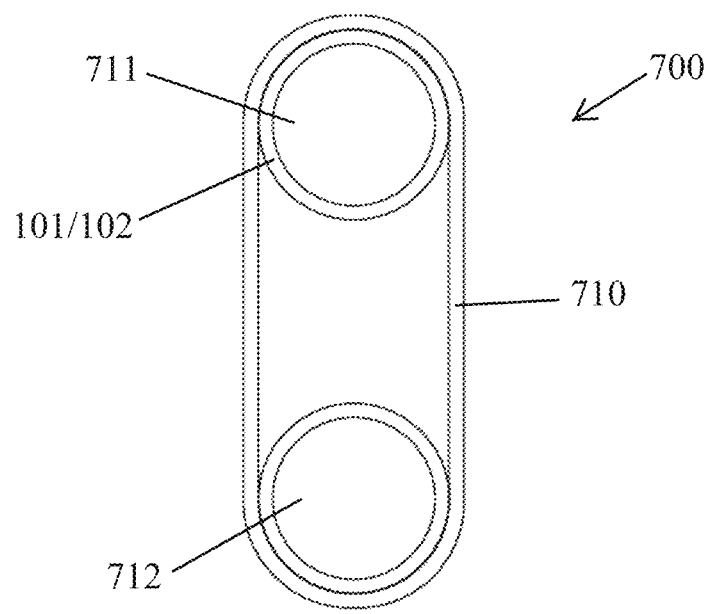
FIGS. 11A-11B are views of a device incorporating electrostatic clutches, according to one embodiment of the present invention.
Figure 11B:
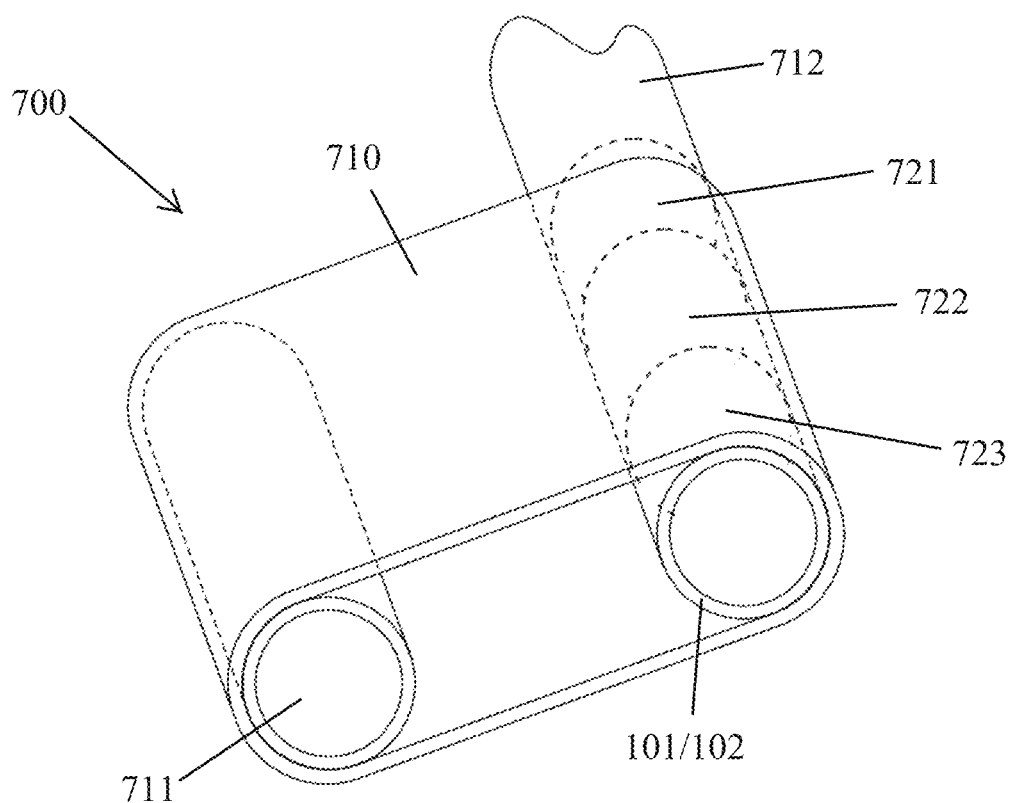

FIGS. 11A-11B depict the electrostatic clutch incorporated into a transmission belt assembly 700, where the clutch selectively couples an input shaft 711 and an output shaft 712. In this embodiment, a transmission belt 710 comprises one of the electrodes 101 or 102 of the clutch 100. The second electrode of the clutch 100 is disposed on the surface (or comprises the surface) of the shafts 711 and 712. As a result, when no voltage is applied across the electrodes 101 and 102 (i.e. the clutch is in the disengaged state), the clutch belt 710 will slip at the shafts 711 and 712. When the clutch is engaged, the belt 710 adheres to both shafts 711 and 712, and torque is transmitted from the input shaft 711 to the output shaft 712. In an alternative embodiment, the input 711 and output 712 shafts can be aligned with concentric electrodes 101, and 102 dispersed between the two shafts 711 and 712. In this embodiment, the clutch 100 can replace the functionality of rotary electromagnetic clutches and magneto-rheological clutches, while using significantly less electrical power. Further, when used in this embodiment, the pretension of the transmission belt 710 can be minimized.

In this example shown in FIG. 11B, a type of variable transmission can be created by providing different sections 721, 722, and 723 on the output shaft 712. The sections 721, 722, and 723 can be connected to gears with different ratios. For example, section 721 can be connected to a gear with a first ratio, section 722 can be connected to a gear with a second ratio, and section 723 can be connected to a gear with a third ratio. By selectively applying a voltage to one of the sections 721, 722, or 723, the transmission belt 710 will transmit the torque through a section with the desired gear ratio.

Figure 12:
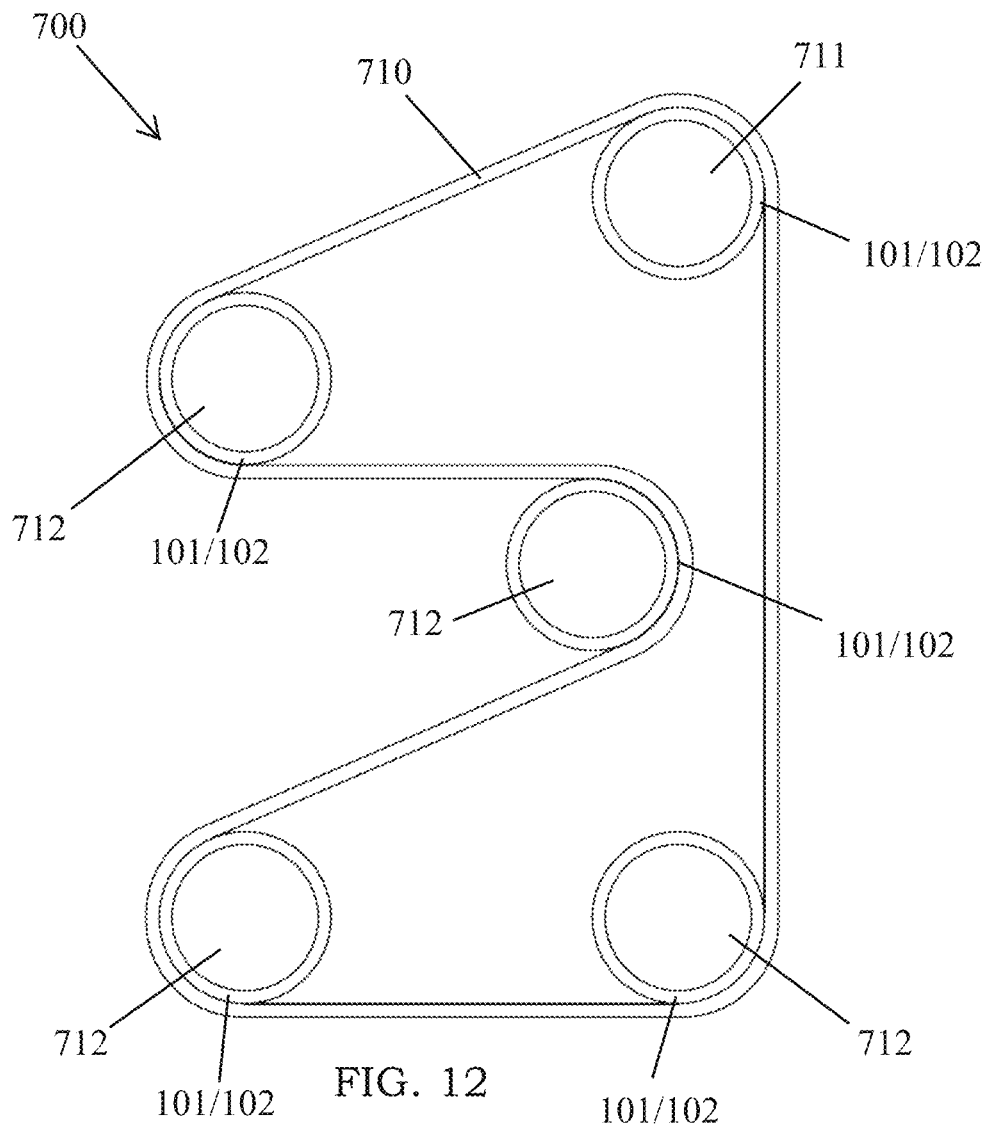
FIG. 12 is yet another device incorporating electrostatic clutches.

FIG. 12 depicts another embodiment incorporating the clutch 100 of the present invention. In this embodiment, a plurality of output shafts 712 are connected by a single transmission belt 710, which is driven by an input shaft 711. The voltage at each output shaft 712 can be controlled to selectively engage or disengage each individual output shaft 712.

Figure 13:
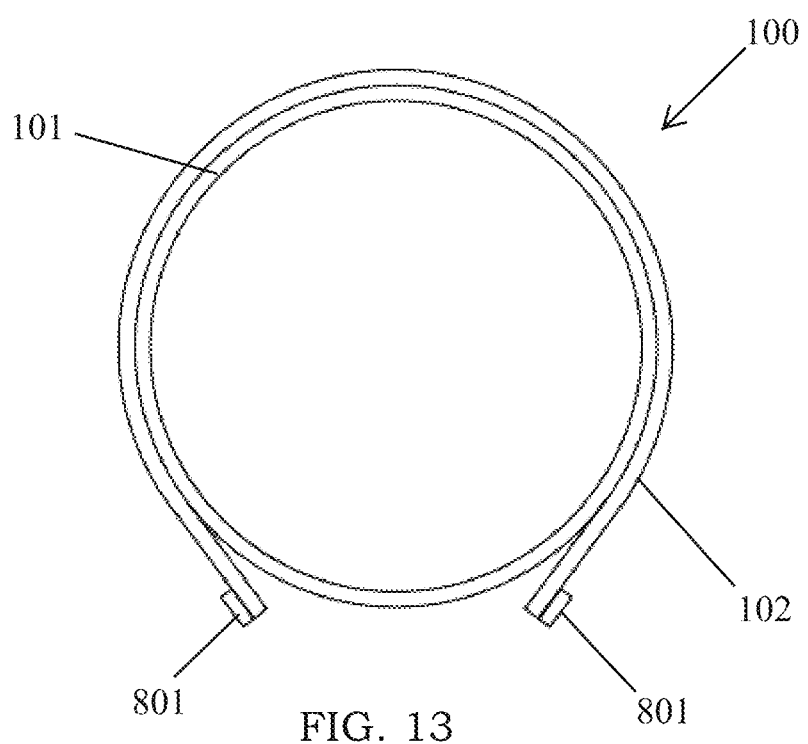
FIG. 13 is a clutch that can be used with a rotating shaft.

FIG. 13 depicts the clutch 100 in an alternative embodiment, with the first electrode 101 comprising a rigid shaft and the second electrode 102 comprising a flexible electrode with rigid bars 801. The rigid electrode 101 can be connected to a motor. The bars 801, which can be constructed from carbon fiber in one example embodiment, can then be connected to an output. When the clutch 100 is engaged, the rigid bars 801 will turn with the shaft. In the disengaged state, the shaft will spin freely without turning the second electrode 102 and rigid bars 801.

Figure 14A:
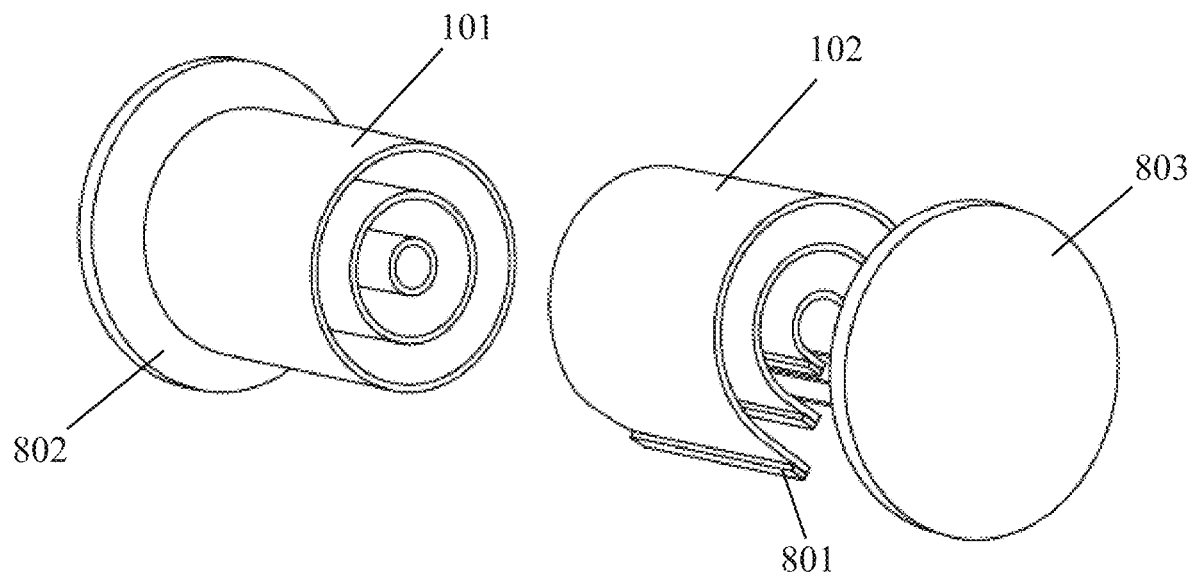
FIGS. 14A-14C show multiple clutches used in a device.
Figure 14B:
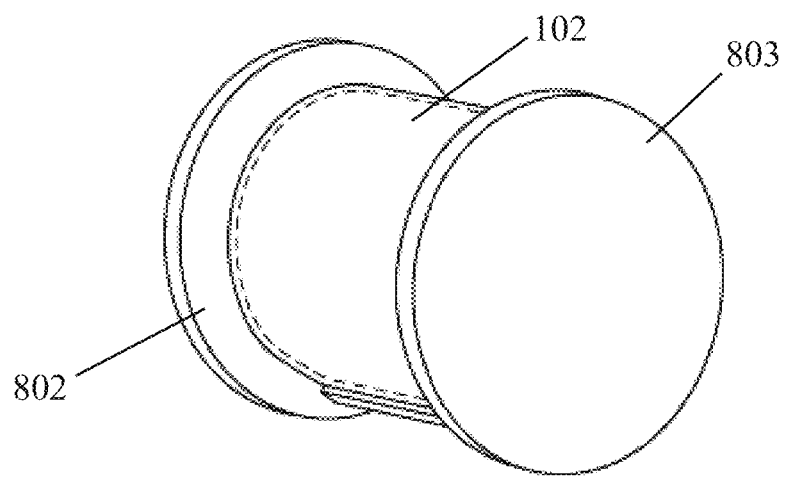
Figure 14C:
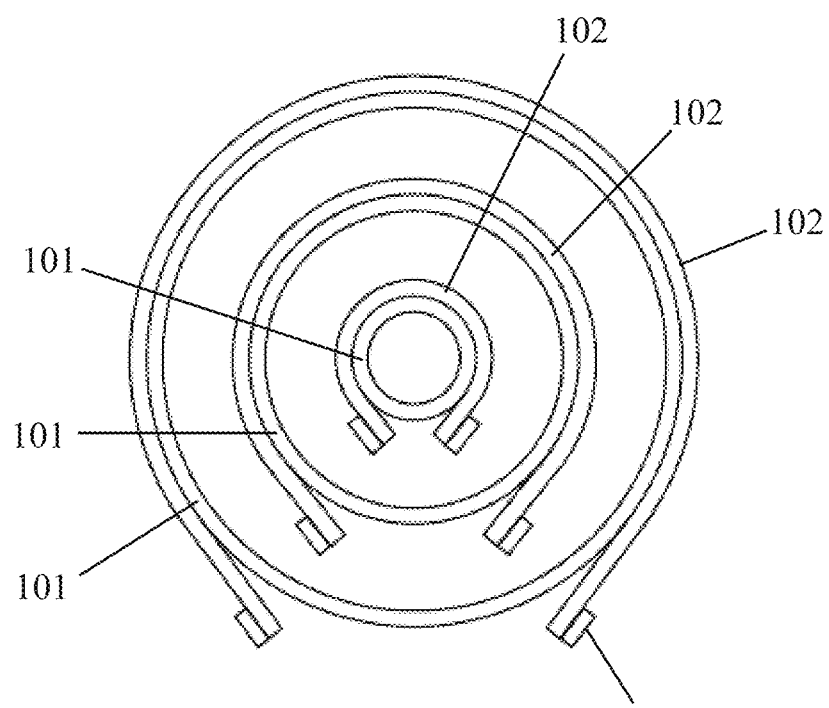

FIGS. 14A-14C show this type of clutch 100 with a plurality of clutches 100 disposed around a plurality of rigid shafts. The shafts are connected to a common input plate connector 802. The rigid bars 801, in turn, will be connected to an output connector 803. Thus, when the clutches are in the engaged state, torque from the input connector 802 will be transmitted to the output connector 803 through the rigid bars 801. The use of concentric clutches allows an increase in the amount of torque that can be transmitted in the same volume.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. An electrostatic clutch for use in an energy-recycling actuator, the clutch comprising:
    a first electrode comprising a conductive film,
        wherein the first electrode is associated with a housing;
    a second electrode comprising a conductive film,
        wherein the second electrode is associated with an object not connected to the housing;
    a third electrode comprising a conductive film,
        wherein the third electrode is positioned between the first electrode and the second electrode,
        wherein the third electrode is connected to an energy storing device connected to the housing;
    a dielectric material separating the third electrode from the first electrode and the second electrode; and
    a power source for applying an electric field across at least two of the first electrode, the second electrode, and the third electrode to develop an electrostatic charge.

2. The electrostatic clutch of claim 1, wherein the electric field is applied across the first electrode and the third electrode to develop an attractive state between the first electrode and the third electrode, storing energy in the energy storing device.

3. The electrostatic clutch of claim 1, wherein the electric field is applied across the second electrode and the third electrode to develop an attractive state between the second electrode and the third electrode, transferring energy from the energy storing device to the object.

4. The electrostatic clutch of claim 1, wherein the dielectric material is comprised of a polymer composite containing barium titanate and titanium dioxide.

5. The electrostatic clutch of claim 1, wherein at least one of the first electrode, the second electrode, and the third electrode comprise a flexible substrate coated with a conductive layer.

6. The electrostatic clutch of claim 5, wherein the substrate is a polymer.

7. The electrostatic clutch of claim 5:
    wherein the substrate is bi-axially oriented polyethylene terephthalate,
    wherein the conductive layer is sputter-deposited aluminum.

8. The electrostatic clutch of claim 1, wherein the energy storing device is a spring.

9. The electrostatic clutch of claim 1, wherein each of the first electrode, the second electrode, and the third electrode are parallel.

10. The electrostatic clutch of claim 1, wherein the dielectric material is disposed on a front surface and a back surface of the third electrode.

11. The electrostatic clutch of claim 1, wherein the dielectric material is disposed on a surface of the first electrode and a surface of the second electrode.

* * * * *